Patented Feb. 12, 1935

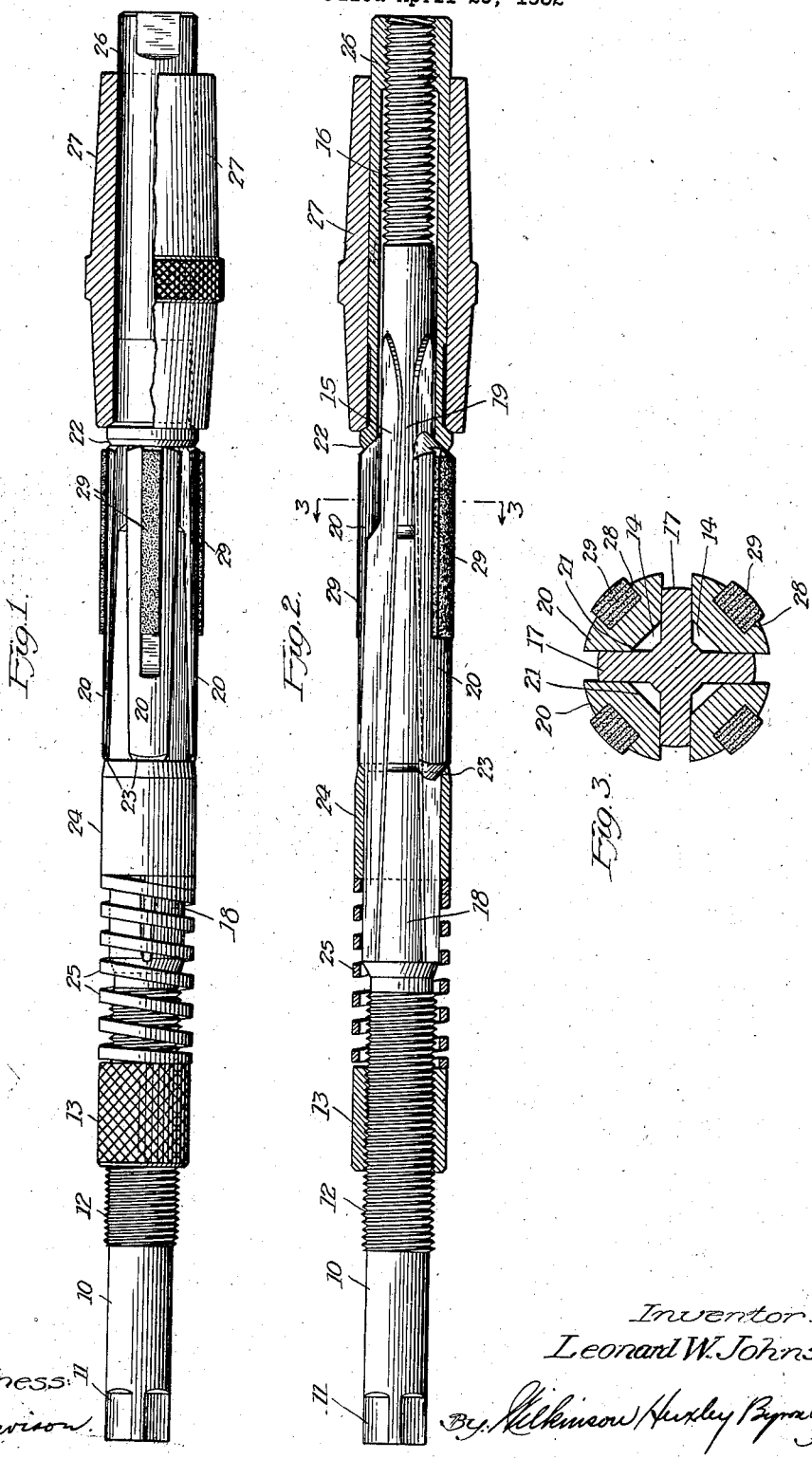

1,991,220

UNITED STATES PATENT OFFICE 1,991,220

EXPANSIBLE HONING TOOL

Leonard W. Johnson, Batavia, Ill.

Application April 25, 1932, Serial No. 607,371

12 Claims. (Cl. 51—184.1)

My invention relates to an expansible honing or lapping tool and has particular reference to a tool which is particularly adapted for honing or lapping the bearings on connecting rods for automobile engines, crank shafts, and the like, and has for its primary object the smoothing out and trueing up of the bearing after it has been reamed, so that a full and complete bearing surface is obtained and the inner surface of the bearing is left in a smooth polished condition so that a minimum amount of friction develops between the bearing and the part upon which it is mounted.

In the fitting of bearings for automobiles, the ideal condition is for the bearing surfaces of the contacting parts to be smooth and the surfaces in full and complete contact with each other. In the reaming of bearings, the bearing surfaces cannot be made smooth enough to insure complete and full contact of the bearing surfaces. One of the objects of my invention is to lap out or smooth up the inner surface of bearings so a full bearing is obtained.

Another and further object of my invention is the provision of an expansible honing tool for use in honing out bearings in which the parts are adjustably mounted so that the tool can be used for lapping out bearings of different sizes, particularly for use in smoothing up the bearing openings for wrist pins and the like which have been reamed out, to accommodate larger sized bearing pins, such as wrist pins and the like, and to take out the irregular surface marks caused by the reaming operation.

Another and further object of my invention is the provision of a lapping tool by means of which the inside surface of the bearing is rendered more smooth and accurate than is now possible to obtain through the use of the usual reamers or other types of cutting tools which have heretofore been used for this purpose.

These and other objects of my invention will be more fully and better understood by reference to the accompanying sheet of drawings and in which—

Figure 1 is a view partially in elevation and partially in section of the tool embodying my invention;

Figure 2 is a longitudinal view showing the body member in elevation and the elements carried thereby in section; and Figure 3 is a transverse sectional view on lines 3—3 of Figure 2.

Referring now specifically to the drawing and in which like reference characters refer to like parts throughout, a body member 10 is shown having a squared end 11 adapted to be inserted in a chuck or other machine member for rotating the tool as a whole, with an externally threaded shank portion 12 over which an internally threaded nut 13 is secured. Formed in the body member 10 and extending longitudinally thereof intermediate its ends, is a plurality of V-shaped channels 14, 14, the said channels having their beginning a short distance from the end of the threaded portion 12 and being extremely shallow at their upper ends, and being gradually tapered to a point indicated as 15 when they are turned outward and terminate short of the threaded portion 16 of the body member at the lower end thereof.

Between each pair of adjacent channels a plurality of ribs 17, 17 are formed, the said ribs being formed wider at their upper ends 18, 18, and have inclined slides which converge towards each other until the ribs are comparatively thin at the portion 19, 19 thereof. Seated in the channels 14, 14 is a plurality of carrier members 20, 20 having inclined sides of V-like formation and having flat surfaces 21, 21, the inclined sides of the members 20 coacting with and engaging against the sides of the ribs 17, 17. The members 20 are fashioned so that the upper end is thinner than the lower end so that in effect the members have a taper in both a vertical and horizontal direction and do not engage against the bottoms of the channels which are formed in the body member 10, but only against the sides of the ribs 17, 17.

The members 20, 20 have inwardly inclined ends 22 and 23 respectively, the ends 23 being adapted to fit under an undercut end of a ring member 24 slidably mounted upon the body member 10 which is held in proper engagement against the members 20 by a spring 25. An internally threaded cylindrical member 26 is provided at the lower end of the body member and in threaded engagement with the end 16 thereof, and which when turned up into relation over the ends 22 of the members 20, holds the members 20 in proper position in the channels formed in the body member 10. By the use of this member the necessary adjustment of the diameter of the tool is provided by the operator turning the nut 26 up on the threaded portion 16, which drives the members 20 towards the shank end of the tool and longitudinally along the channels formed in the sides of the body member, so that they are moved outward from the central axis of the body member 10, thereby increasing the size of the tool for various bearings.

The collar 27 is provided which slips over the member 26 and provides means whereby the tool is properly aligned in the bearings by inserting the cone-shaped member 27 in a bearing and then placing the front end of the reaming tool through the bearing and into the collar 27, which is carried by an adjacent bearing. It is the usual practice to ream bearings on connecting rods and the like in pairs, that is, a pair of connecting rods are mounted in such manner that the centers of their bearings are coincident with each other, and one of the bearings is reamed with the tool in such manner that the tool is properly centered by a cone bearing placed in the opposite connecting rod. When the operation on one rod is completed, the tool is turned in such a position so that it can be run through the bearing which formed the guide for the tool in the first instance, and in this manner the bearings are properly aligned with each other, and the axes of the bearings are sure to coincide. Of course, a guide member could be provided for this purpose, if desired.

Longitudinally extending channels 28, 28 are provided in the members 20, and hones 29, 29 are mounted in these members, these hones being prepared from various kinds of stones having abrasive qualities or from carborundum and the like, and cemented in place in the channels 28, 28 in the members 20. These hones or abrasive members 29 form the lapping or cutting portions of the tool when placed in a bearing.

It will be noted that the members 17, 17 are materially wider at their ends 18 adjacent the driving end 11 of the body member 10, and taper materially towards the front end of the tool so that these members 18 bear the greater portion of the torsion strain which is placed upon the tool when it is in service. In this manner the tool is made exceptionally rugged and strong and at the same time the necessary adjustment can be made to fit the tool into bearings of varying sizes.

In operation the device is exceedingly simple in that in its assembled relation it can be adjusted to various sizes by the ends 13 and 26. When it is desired to smooth out and true up a bearing, the chuck end 11 is placed in an electric drill or other means of rotating the tool rapidly, and the member placed in such adjustable position that the hones 29 will engage on the inner surface of the bearing as the tool is rotated.

Preferably the tool is adjusted to remove about 1/10,000th of an inch of metal from the bearing which is sufficient to smooth the inner surface thereof. As previously set forth, this tool is adapted particularly for smoothing and trueing a bearing after it has been reamed or bored with some form of a cutting tool, and which ofttimes leaves the inner surface of the bearing slightly rough so that it is impossible to get the proper fit between the bearing parts when the operating mechanism is assembled, and also to insure full bearing surface contact when the bearing and operating part are in assembled relation. When the bearings are reamed out, the excess metal is cut away until the bearing is within 1 to 3/10,000th of the proper size, when the tool of my present invention is used for smoothing out the bearing and taking out a very slight film of metal, smoothing and reaming it to exact dimension and taking away the high spots in the bearing surface.

After the tool has been adjusted to proper size, the operating mechanism is started and the tool is passed through the bearing while being rotated rapidly, being held in proper alignment either by proper gauge mechanism or through the use of another bearing which has been previously placed in aligned relation with the bearing that is being lapped out. In this manner through the use of this tool, a slight excess of metal is removed and all channels and marks of the cutting tools eliminated. If for any reason it is desired to pass the tool through a bearing a number of times, the end nut 26 is turned up with each operation, thereby slightly increasing the size of the tool so that each time it is passed through the bearing a slight quantity of metal is removed therefrom.

It will here be explained that the only parts of the tool which are subjected to any material wear are the abrasive or hone members 29, and therefore the only parts which are likely to require replacing are the composite abrasive members made up of the carrier members 20 and the hones 29. In this connection, it will be noted that the hones or abrasive members 29 lie entirely within the peripheries of the outer faces of the carrier members 20 and do not contact with and therefore have no wearing effect upon any of the portions of the tool, as it is the carrier members 20 that engage the walls of the grooves 14 in the shank of the tool, and it is the ends of the members 20 which engage the parts 22 and 24, and therefore there is no possibility of the abrasive members or hones 29 causing any wear upon any portion of the tool due to adjustment of the parts 20 longitudinally of the tool under the influence of the adjusting nut 26.

Another important feature of the invention resides in the fact that the inner longitudinal corner or edge portion of each carrier member 20 is removed, so that the carrier member terminates short of the bottom of the channel in which it is mounted, thus permitting the longitudinal side walls of the carrier member to properly and accurately engage the corresponding walls of the channel 14. The fact that each carrier member terminates short of the bottom of each channel permits the provision of a strengthening fillet in the bottom of each channel.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A lapping tool, comprising in combination, a body member having V-shaped channels therein which become deeper and wider towards the end opposite the driven end of the body member, a plurality of V-shaped carrier members having inwardly inclined ends in said channels, a movable member having one undercut edge, an internally threaded ring member in threaded engagement with the body member and in cooperative relation with the movable member, an end member in threaded engagement with the end of said body member and having one undercut end, and abrasive members carried by said V-shaped carrier members.

2. A lapping tool, comprising in combination, a body member having V-shaped channels therein which become deeper and wider towards the end opposite the driven end of the body member, a plurality of V-shaped carrier members having inwardly inclined ends in said channels and having channels therein, a movable member having one undercut edge, an internally threaded ring member in threaded engagement with the body member and in cooperative relation with the movable member, an end member in threaded engagement with the end of said body member and having one undercut end, and abrasive members mounted in the channels of said V-shaped carrier members.

3. A lapping tool, comprising in combination, a body member having V-shaped channels therein which become deeper and wider towards the end opposite the driven end of the body member, a plurality of V-shaped carrier members having inwardly inclined ends in said channels and having channels therein, a movable member having one undercut edge, an internally threaded ring member in threaded engagement with the body member and in cooperative relation with the movable member, an end member in threaded engagement with the end of said body member and having one undercut end, and hones mounted in the channels of said V-shaped carrier members.

4. A lapping tool, comprising in combination, a body member having V-shaped channels therein which become deeper and wider towards the end opposite the driven end of the body member, and having ribs which are wider towards the driven end of the body member than at their opposite ends, a plurality of V-shaped carrier members having inwardly inclined ends in said channels, the said V-shaped members engaging only the sides of the ribs, a movable member having one undercut edge, an internally threaded ring member in threaded engagement with the body member and in cooperative relation with the movable member, an end member in threaded engagement with the end of said body member and having one undercut end, and hones mounted in the channels of said V-shaped carrier members.

5. A lapping tool, comprising in combination, a body member having V-shaped channels therein which become deeper and wider towards the end opposite the driven end of the body member, and having ribs which are wider towards the driven end of the body member than at their opposite ends, a plurality of V-shaped carrier members having inwardly inclined ends in said channels, the said V-shaped members engaging only the sides of the ribs and being narrower and shallower towards the driven end of the tool than at their opposite ends, a movable member having one undercut edge, an internally threaded ring member in threaded engagement with the body member and in cooperative relation with the movable member, an end member in threaded engagement with the end of said body member and having one undercut end, and hones mounted in the channels of said V-shaped carrier members.

6. A lapping tool, comprising in combination, a body member having V-shaped channels therein, a plurality of V-shaped members in said channels, supported on the walls thereof and terminating short of the bottoms of the channels and having inwardly inclined ends, the said V-shaped carrier members being narrower and shallower towards the driven end of the tool than at their opposite ends, a movable member having one undercut edge, an internally threaded ring member in threaded engagement with the body member and in cooperative relation with the movable member, an end member in threaded engagement with the end of said body member and having one undercut end, and hones mounted in channels in said V-shaped carrier members.

7. A lapping tool, comprising in combination, a body having a V-shaped channel extending longitudinally therein and which tapers longitudinally in two dimensions thereof, a V-shaped carrier member mounted in the channel and supported upon the inwardly converging walls thereof and terminating short of the bottom of the channel, said carrier member being tapered longitudinally in two dimensions to correspond with the shape of the channel, a spring pressed abutment member mounted on the body and yieldably held against one end of the carrier member, an interiorly threaded adjustment member in threaded engagement with the body and in engagement with the opposite end of the carrier member, and a hone carried by the outer side of the carrier member and out of contact with any of the other parts of the tool.

8. A lapping tool, comprising in combination, a body having a V-shaped channel extending longitudinally therein and tapered longitudinally in two dimensions, the body having integral fillets across the bottoms of the channels, V-shaped carrier members fitting in the channels and supported upon the side walls thereof and terminating short of the fillets, each carrier member being tapered in two dimensions to correspond with the tapers of the channels, a hone carried by the outer face of each carrier member and lying within the peripheral edge thereof, and means carried by the body in cooperative relation with the respective ends of the carrier members to hold the same in the grooves, said means being adjustable to adjust the carrier members endwise in the grooves.

9. A lapping tool, comprising in combination, a body having V-shaped channels therein, a plurality of V-shaped carrier members in said channels supported on the walls thereof and having inclined ends, the said members being narrower and shallower towards one of their ends than at their opposite ends, an abutment member having an undercut edge, engaging the adjacent inclined ends of the V-shaped members, an end member in threaded engagement with the opposite end of said body member and having one undercut end in engagement with the other inclined ends of said V-shaped members, and abrasive members mounted in channels in said V-shaped carrier members.

10. A lapping tool comprising, in combination, a body member having a plurality of elongated radial grooves therein, said grooves being inclined with respect to the axis of the body and having outwardly diverging side walls, carrier members in said radial grooves having their side walls in close fitting contact with the said outwardly diverging side walls and being adapted to be moved longitudinally of said grooves, abrasive elements provided upon the outer faces of said carrier members and having substantially unbroken abrasive surfaces of relatively great width, and adjustable retaining members carried by said body member and in cooperative relation with the ends of said carrier members and adapted to be adjusted to varying positions whereby the said carrier members are adapted to varying diameters.

11. A lapping tool comprising, in combination, a body member having a plurality of elongated radial grooves therein, said grooves being inclined with respect to the axis of the body and having outwardly diverging side walls, carrier members having portions thereof in said radial grooves with the sides of these portions in close fitting contact with the said outwardly diverging side walls and being adapted to be moved longitudinally of said grooves, abrasive elements provided upon the outer faces of said carrier members and having substantially unbroken abrasive surfaces of relatively great width, and adjustable retaining members carried by said body member and in cooperative relation with the ends of said carrier members and adapted to be adjusted to varying positions whereby the said carrier members are adapted to varying diameters.

12. As a new article of manufacture, an abrading member for a rotary honing tool, comprising an elongated carrier body substantially V-shaped in cross section and tapered longitudinally in two directions, and an abrasive element provided upon one of the faces of the carrier body and having a substantially unbroken abrasive surface portion of relatively great width lying within the peripheral edges of said face of the carrier body.

LEONARD W. JOHNSON.